United States Patent [19]

Klages et al.

[11] Patent Number: 5,466,035
[45] Date of Patent: Nov. 14, 1995

[54] IMPROVED VEHICLE FRONT-END SUPPORT STRUCTURE FOR A PASSENGER CAR

[75] Inventors: Ulrich Klages, Lenting; Alois Feldschmid, Ingolstadt; Gundolf Kreis, Oberstimm; Heinrich Timm, Ingolstadt, all of Germany

[73] Assignee: Audi AG, Ingolstadt, Germany

[21] Appl. No.: 78,199

[22] PCT Filed: Nov. 26, 1991

[86] PCT No.: PCT/EP91/02230

§ 371 Date: Jun. 18, 1993

§ 102(e) Date: Jun. 18, 1993

[87] PCT Pub. No.: WO92/11161

PCT Pub. Date: Jul. 9, 1992

[30] Foreign Application Priority Data

Dec. 20, 1990 [DE] Germany .............. 40 40 951.1

[51] Int. Cl.⁶ ................................. B65D 25/08
[52] U.S. Cl. .............. 296/205; 296/188; 296/194
[58] Field of Search ................. 296/187, 188, 296/189, 193, 194, 195, 198, 203, 205

[56] References Cited

U.S. PATENT DOCUMENTS

| 4,264,101 | 4/1981 | Gotoh ............................. 296/194 |
| 4,359,120 | 11/1982 | Schmidt et al. ............... 180/69 R |
| 4,470,341 | 9/1984 | Hirukawa et al. ............ 98/2.16 |
| 4,560,198 | 12/1985 | Katano et al. ............. 296/194 X |
| 4,826,238 | 5/1989 | Misono et al. ............... 296/209 |

FOREIGN PATENT DOCUMENTS

| 0146716 | 7/1985 | European Pat. Off. ........ B62D 23/00 |
| 2456029 | 12/1980 | France ............................ B62D 22/00 |
| 2258290 | 6/1974 | Germany ....................... B62D 23/00 |
| 2713604 | 10/1978 | Germany ....................... B62D 25/08 |
| 3007760 | 9/1980 | Germany ....................... B62D 25/16 |
| 3337708 | 10/1984 | Germany ....................... B62D 25/08 |
| 3925170 | 2/1990 | Germany ....................... B62D 25/04 |
| 58-61075 | 4/1983 | Japan ............................. B62D 25/20 |
| 2175385 | 7/1990 | Japan ............................. B62D 25/08 |
| 2-249773 | 10/1990 | Japan ................................. 296/203 |

*Primary Examiner*—Andrew C. Pike
*Attorney, Agent, or Firm*—Jacques M. Dulin; Frederick J. Zustak

[57] ABSTRACT

The invention relates to an improved vehicle bodywork for a passenger car with a bearing structure of light-metal extruded sections connected together by cast light metal joining elements. The joining element is disposed on the A pillar assembly and is fitted between a downward sloping forward roof pillar and a vertically oriented forward door pillar and holds an extruded section front end fender brace which extends outwardly therefrom towards the front end of the vehicle. According to the invention, a portion of the outer profile of fender brace conforms to the cross-sectional shape of a surrounding fender panel connected thereto. In this way, the space beneath the fender panel is used to increase the cross section of the fender brace and hence increase rigidity. In a preferred embodiment, the fender brace is L-shaped in cross section having two approximately rectangular hollow-chambers including an outwardly disposed vertical hollow-chamber area and laterally inwardly extending horizontal hollow-chamber. In another embodiment, an additional extruded section wheel housing support member is provided which is connected between and forms a generally right-angled triangle with the generally horizontally oriented fender brace and the generally vertically oriented forward door pillar to further stiffen the assembly.

10 Claims, 1 Drawing Sheet

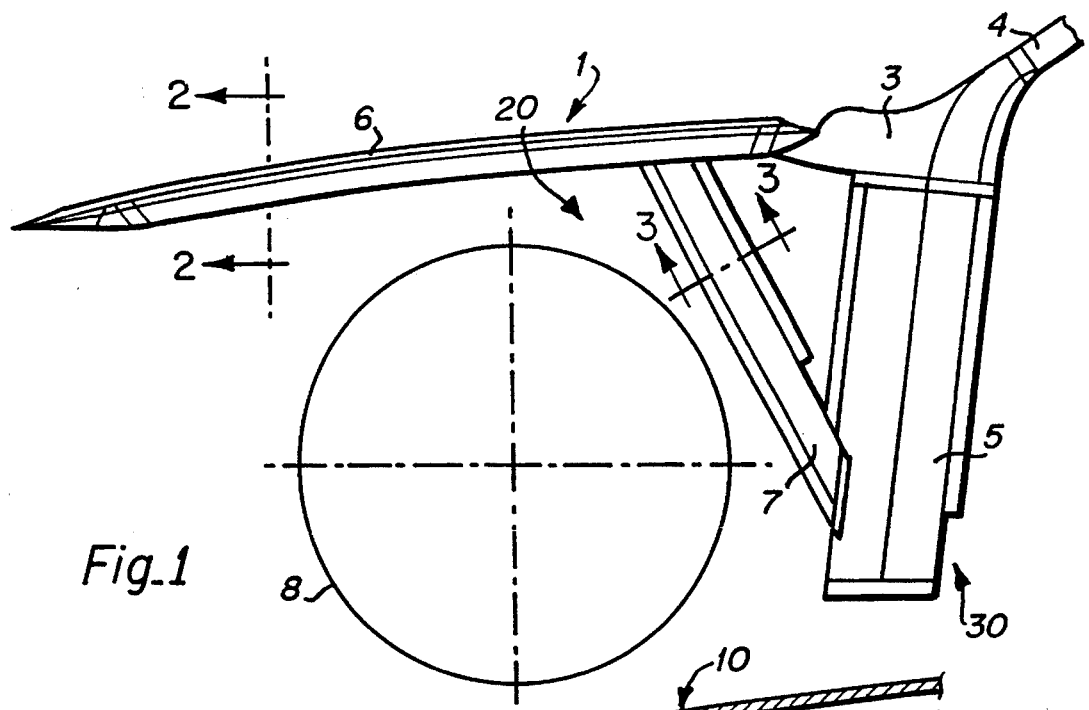
Fig_1
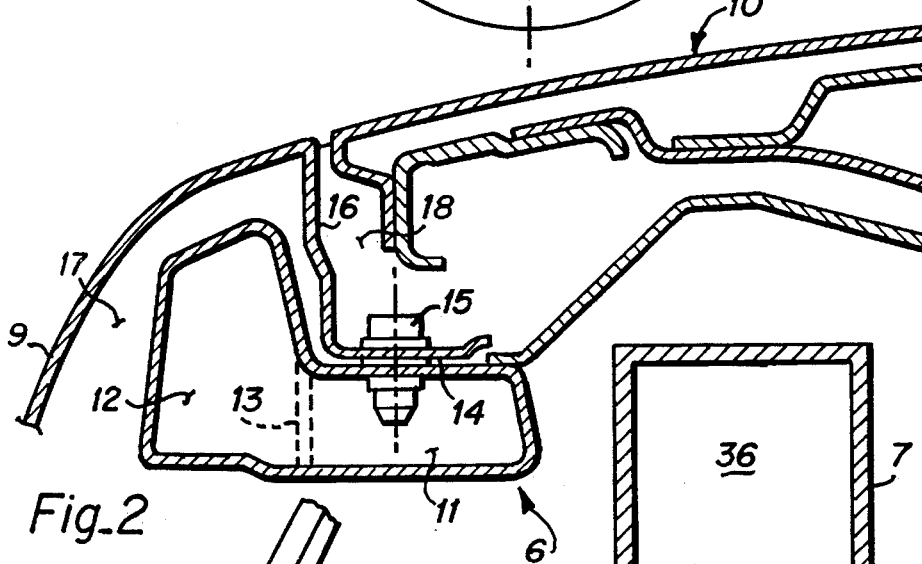
Fig_2
Fig_3
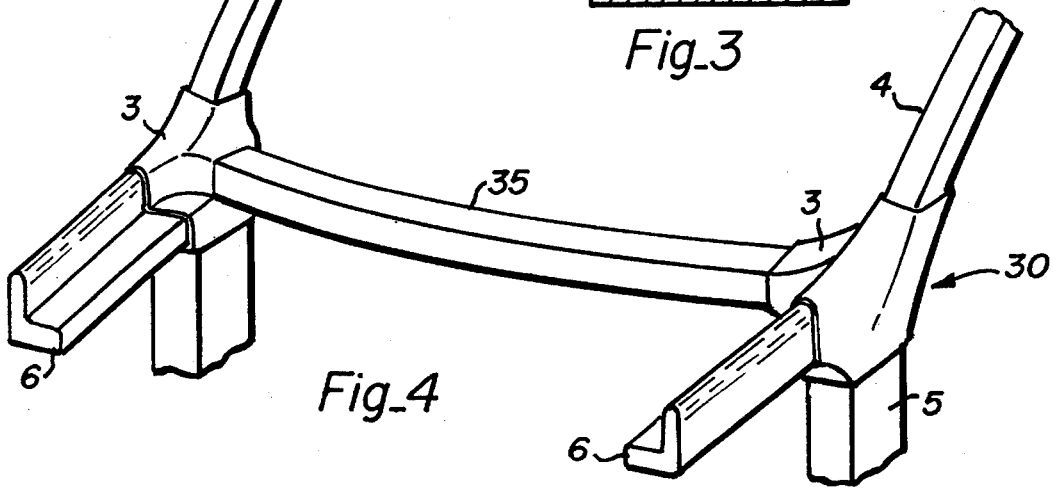
Fig_4

5,466,035

IMPROVED VEHICLE FRONT-END SUPPORT STRUCTURE FOR A PASSENGER CAR

FIELD

The present invention relates to a structure of a forward body of a passenger vehicle, and more particularly to an improved side structure for mounting a front fender panel to a front fender brace.

BACKGROUND

Customary self-supporting vehicle bodies for passenger vehicles, including the supporting structure, are manufactured from sheet-metal parts. It is a known practice to secure a front fender panel on a front fender brace which extends in a forward direction from a central region of the forward A pillar assembly disposed along the side of the vehicle body. Such a front fender brace typically consists of two deep-drawn sheets which are connected together to form an enclosed cross section. The enclosed cross section typically is not constant over much of its length and in most cases consists merely of a single bent sheet in the forwardmost region. To increase the stiffness of this arrangement, it is also the known practice to provide an additional triangular sheet as a reinforcement between the front fender brace and the lower portion (forward door pillar) or bottom half of the A pillar assembly.

The steel sheets used to construct such bodies are formed by the deep-drawing process. The pressing tools used for forming the sheets are relatively expensive but allow for very large batch quantities, thus providing an economical solution for industrial-scale manufacture. However, due to the high investment costs needed for tooling, the above described process is very cost-intensive for small production runs. In addition, it would be desirable to improve the rigidity and crash characteristics of the known embodiment of a front fender brace using sheet-metal parts without increasing weight due to additional reinforcements or added material thicknesses of the component parts.

It is therefore known from published European Patent Document EP 0 146 716 B1, particularly for small production runs, to manufacture vehicle bodies for passenger vehicles with a supporting structure consisting of hollow sections which are connected to one another by junction elements. Here, the hollow sections are designed as light-alloy extruded sections and the junction elements are designed as light-alloy castings.

In such an embodiment, a junction element is positioned at the A pillar assembly, between a forwardly and downwardly angled forward roof pillar and a substantially vertically oriented forward door pillar. This junction element includes recesses or mounts for receiving the adjoining ends of the forward roof pillar and the forward door pillar as well as a forward cross member and a front fender brace. The forward roof pillar, the forward door pillar, the forward cross member, and the fender support brace are embodied as light-alloy extruded sections.

Here, however, the front fender brace has only a simple, approximately square cross section. This results in a waste of interior space between the exterior surfaces of the square cross section fender brace and the generally curved interior surface of the fender panel supported thereon. The presence of the space between the fender panel and the fender brace also means that the curved fender panel is more easily subject to deformation from minor impacts in this region.

THE INVENTION

OBJECTS

It is therefore a principal object of the present invention to further develop a front fender brace of the generic type in such a way that improved utilization of interior space in combination with an improvement in stiffness is achieved.

Other or further objects will become evident from the following detailed description, drawings and appended claims.

SUMMARY

According to the invention, a portion of the profile cross section of the front fender brace disposed adjacent the outer sides of the vehicle is adapted to the generally curved interior surface of the front fender panel connected thereto. The space underneath the fender panel is thus utilized to enlarge the cross section of this section of the front fender brace and hence increase overall stiffness in this region.

Such adaption of the cross section for the front fender brace is simple to achieve by virtue of the fact that the section is produced as a light metal extrusion, preferably aluminum alloy, and thus even complicated cross sectional shapes can be produced. In addition, the extruded section fender brace can be bent along its longitudinal axis to conform to the inner profile curvature of the fender panel in the longitudinal direction.

Further still, the adaption of the cross section to the interior curved surface of the fender panel not only permits an enlargement of the cross sectional area of the fender brace relative to the square cross section of the prior art, but the outer periphery of the section is structured by means of grooves, hollows, and, if required, undercuts, so that the extruded section itself now has an overall higher stiffness.

In a preferred embodiment of the invention, the profile cross section of the fender brace is of L-shaped configuration. Here, a horizontal leg of the L is embodied as a first, approximately horizontal rectangular hollow-chamber region situated towards the middle of the vehicle. A vertical leg of the L is embodied as a second, rectangular hollow-chamber region situated towards the outside of the vehicle and is further adapted along its outward side and top surfaces to conform to the cross sectional shape of the surrounding fender panel.

Such a design for the section results in a favorable assembly arrangement and further provides the possibility for fastening a fender panel resting by an edge flange on the upper side of the first hollow-chamber region which is preferably connected thereto by fastening means, such as for example bolt fasteners. Adjoining the edge region, the cross-sectional contour of the fender panel then conforms to the second hollow-chamber area. In this arrangement, the interior space enclosed by the fender panel and fender brace is used in an optimum way for the shape of the fender brace section. The fender brace is formed with an inwardly and upwardly disposed relief area in the shape of a right angle. This angled relief area has a sufficient depth and width for receiving an adjoining edge region of a hood or bonnet, allowing for its thickness, so that the outer contour of the hood is flush with the outer contour of the fender panel.

In order to further increase the stiffness of the fender brace, it may be advantageous, depending on the circumstances, to design the fender brace extrusion as a multi-chamber hollow section whereby the individual hollow-chamber regions are separated by one or more webs. Strength adaptations are also possible by way of different wall thicknesses for the various chamber walls.

In order to further increase the sturdiness of the arrangement, thereby, for example, also creating possibilities for more stable attachment and fastening of auxiliary units and containers, the invention proposes to use an additional member, fashioned as a wheel housing support, which is located at a distance from the junction element and extends between the underside of the fender brace and the forward edge of the door pillar. The wheel housing support thus forms the long side or hypotenuse of a generally right-angled triangle with the substantially vertically oriented A pillar assembly and generally horizontally oriented fender brace. In this way, the fender brace is supported from below by the forward door pillar to provide a favorable introduction of force and distribution of the impact energy in the event of a frontal impact.

It is advantageous to position the obliquely oriented wheel housing support at a sufficient distance away from the junction element in order to utilize the maximum available space adjacent the vehicle tire in order to obtain as large a triangular support as possible.

The wheel housing support is preferably embodied as a light-alloy extruded section, which is connected to the fender brace and the forward door pillar. These connections are preferably made by welding. Alternatively, these connections may be made adhesive bonding and/or riveting. An approximately square cross section of the section for the wheel housing support has proven expedient. The width of the section is preferably matched to the width of the fender brace and door pillar.

DRAWINGS

An exemplary embodiment of the invention with further details, features, and advantages is explained in greater detail with reference to the drawings, in which:

FIG. 1 is a schematic side view of the supporting structure in the forward area of the body of a passenger vehicle shown with a door pillar 5, a fender brace 6, a junction element 3, a wheel housing support 7 and a tire 8; and FIG. 2 is a cross section taken along the line and looking in the direction of arrows 2—2 of FIG. 1 showing a fender brace 6 having a bolted-on fender panel 9 and a side edge region of a hood 10.

FIG. 3 is a cross-sectional view of the wheel housing support member; and

FIG. 4 is a perspective view of a portion of the front-end support structure showing the forward cross member which forms a lower frame boundary for a windshield.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows the forward area of a supporting structure of the vehicle body 1 of a passenger vehicle, and more particularly shows the design in the region of the A pillar assembly 30 and of the wheel housing 20.

The supporting structure comprises a junction element 3 disposed connecting the adjoining ends of a downwardly sloping forward roof pillar 4 and a forward, approximately vertical door pillar 5.

The roof pillar 4 and the door pillar 5 are each connected by one end to the junction element 3. Also connected to the junction element 3 are two further members including a cross member (not shown) which runs into the plane of the drawing and forms the underside of the front windshield (also not shown) and a fender brace 6 which extends generally horizontally from the junction element 3 towards the front side of the vehicle. The roof pillar 4, the door pillar 5, the cross member, and the fender support brace 6 are all preferably formed as extruded aluminum hollow sections. Also, the junction element 3 is preferably formed as an aluminum casting.

The member parts when formed as hollow-bodied extrusions thus have an enclosed, constant cross section over their respective lengths. In particular, the use of extruded sections means that the fender brace 6 is of integral construction and has the existing stiffness over its entire length. This has a positive effect on the crash characteristics since this member can now accept impact energy from the outset. The high stiffness of the extruded fender brace allows for stable attachment and fastening of auxiliary units and containers thereto since it is a simple matter to include integrally formed exterior flanges or edge webs on the section in view of the flexibility afforded by the extrusion process.

A further member designed as a wheel housing support 7 is disposed connected between the fender support brace 6 and the forward door pillar 5 at a distance from the junction element 3. In the preferred embodiment, the wheel housing support 7 is connected to the fender brace 6 and door pillar 5 by welds; however, known glue adhesive bonding techniques may also be used to make these connections so long as sufficiently large contact regions are present to provide a good bond. Rivet bonding or similar connecting schemes may also be employed here. The length of the wheel housing support 7 and its oblique orientation are, as can be seen, chosen so that the maximum available space towards a vehicle tire 8 is utilized. In this way, a sturdy triangular support arrangement is achieved.

FIG. 2. is a cross-sectional view through the fender brace 6 showing a fender panel 9 supported thereon and also showing the position of a hood 10.

The fender brace 6 preferably has an L-shaped profile cross section. A first, lower leg of the L consists of a first, rectangular hollow-chamber 11 situated approximately horizontally towards the middle of the vehicle. A second leg of the L consists of a second, approximately vertical rectangular hollow-chamber 12 situated towards the outside of the vehicle. To increase stiffness, the two hollow-chambers 11 and 12 can, if desired, be separated by a web 13 (shown in phantom); one or more webs may be used if desired. The fender panel 9 has a generally horizontally oriented edge flange 14 which in use is adapted to rest on the upper side of the first hollow-chamber area 11 and is fastened thereto by fastening means 15. In the preferred embodiment shown, the means for fastening the edge flange 14 to the hollow-chamber area 11 comprise screwed joints 15.

Adjoining the edge flange 14, the fender brace 6 is bent upwards with an approximately vertical wall 16 and then curves around the second hollow-chamber 12. The area 17 under the upper part of the fender panel 9 is thus utilized for the enlarged L-shaped cross section of the fender brace 6. In the example embodiment shown in FIG. 2, the area 17 representing the space between the exterior surface of the fender brace 6 and interior curved surface of the fender panel 9 is shown as greatly exaggerated for clarity. In use, it is understood that the second hollow chamber 12 may be enlarged to occupy more of the available volume enclosed by the fender panel 9 as desired.

In the area 18 formed by the L shape of the fender brace 6, the bonnet or hood 10 is situated in such a way with its longitudinal edge and, allowing for its thickness, the outer contour of the fender panel 9 and the hood 10 form a continuous smooth transition.

FIG. 3 shows a cross section view of the preferred wheel housing support member 7 of this invention. Preferably, the wheel housing support member 7 has a square cross section 36.

FIG. 4 is a perspective view of a portion of the vehicle front-end support structure of this invention. The forward cross member 35 is shown spanning the width between the right and left A pillar assemblies 30, and each of its terminal ends are receivingly engaged in a junction element 3. The forward cross member forms the lower frame support for the front windshield.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. In a motor vehicle front end having a supporting structure comprising a plurality of light-alloy extruded section frame members connected together along adjoining ends thereof by cast light-alloy junction elements and which includes one junction element disposed along a forward A pillar assembly of a motor vehicle between a first, lower and generally vertically oriented forward door pillar portion and a second, upper and obliquely oriented roof pillar portion, and wherein the one junction element further includes means for receivingly engaging a forward cross member which forms a lower frame boundary for a front windshield, wherein the improvement comprises:

a) a light-metal alloy extruded hollow-section, unitary construction, generally horizontally oriented, fender support brace having an enclosed, constant, generally L-shaped profile in cross section which includes:
      i) a first rearward end receivingly engaged in said one junction element, and
      ii) a second, forward end extending from said one junction element towards the vehicle front end;
      iii) said L-shaped profile having a first, generally vertically oriented, hollow-cheered leg portion having a top wall, a bottom wall, and spaced exterior and interior side walls, said walls being planar, said exterior side and top walls being disposed outwardly adjacent a front fender panel and being inclined obliquely to form an enlarged outer surface contour which substantially conforms to a surrounding interior surface contour of the front fender panel hereby substantially utilizing a space between said interior contour and said outer surface contour to provide an enlarged cross-sectional area of said L-shaped profile thereby increasing a stiffness of said fender support brace, and
      iv) a second, generally horizontally oriented, hollow-chambered leg portion of approximately rectangular cross section disposed at a lower end of said interior side wall and which extends inwardly toward a longitudinal center axis of the vehicle, said second leg portion having a top wall, a bottom wall, and an interior side wall, said top wall thereof having an exterior top surface, said fender panel being connected to said exterior top surface;
      v) said bottom wall of said second leg portion being vertically offset from said bottom wall of said first leg portion, and said interior side wall of said second leg portion being inclined to form an acute angle with said bottom wall of said second leg portion; and b) an obliquely oriented light-alloy extruded wheel housing support member disposed forwardly of said one junction element and having a first end connected to said fender support brace and a second end connected to said lower forward door pillar portion;

c) said wheel housing support member having a selected length and oblique orientation to form a triangular supporting structure with said fender support brace and said lower forward door pillar portion, and said triangular supporting structure occupying a maximum available space between said one junction element and a vehicle tire disposed forwardly thereof to provide improved force transmission and impact energy distribution characteristics through the vehicle front end in the event of a frontal impact.

2. A motor vehicle front end as in claim 1 which includes:

a) means for removably connecting a lateral edge flange member of said front fender panel to said exterior top surface thereby leaving an L-shaped relief area disposed inwardly of said first leg portion and above said second leg portion, said L-shaped relief area sized for receiving an adjoining longitudinal edge of a hood so that an outer profile contour of said hood is flush with an outer profile contour of said front fender panel.

3. A motor vehicle front end as in claim 2 wherein said fender support brace comprises a multi-chamber hollow section member in which:

a) said first leg portion defines a first chamber;
   b) said second leg defines a second chamber; and
   c) said first and second chambers are separated by at least one web member.

4. A motor vehicle front end as in claim 3 wherein said wheel housing support is a generally open square in cross section.

5. A motor vehicle front end as in claim 4 wherein said means for removably connecting comprises bolt fasteners.

6. A motor vehicle front end as in claim 1 wherein said fender support brace comprises a multi-chamber hollow section member in which:

a) said first leg portion defines a first chamber;
   b) said second leg defines a second chamber; and
   c) said first and second chambers are separated by at least one web member.

7. A motor vehicle front end as in claim 6 wherein said wheel housing support is a generally open square in cross section.

8. A motor vehicle front end as in claim 7 which includes bolt fasteners for removably connecting a front fender panel lateral edge flange member to said exterior top surface.

9. A motor vehicle front end as in claim 1 wherein said wheel housing support is a generally open square in cross section.

10. A motor vehicle front end as in claim 9 which includes bolt fasteners for removably connecting a front fender panel lateral edge flange member to said exterior top surface.

* * * * *